Oct. 30, 1951　　C. H. SMITH, JR　　2,572,891

TIMING CIRCUIT

Filed May 3, 1945　　5 Sheets-Sheet 1

Inventor
CARL H. SMITH, JR.

By Ralph L. Chappell

Attorney

Oct. 30, 1951 C. H. SMITH, JR 2,572,891

TIMING CIRCUIT

Filed May 3, 1945 5 Sheets-Sheet 2

Inventor
CARL H. SMITH, JR.

By Ralph L. Chappell
Attorney

Oct. 30, 1951 C. H. SMITH, JR 2,572,891

TIMING CIRCUIT

Filed May 3, 1945 5 Sheets-Sheet 3

Inventor
CARL H. SMITH, JR.

By Ralph L. Chappell
Attorney

Oct. 30, 1951 C. H. SMITH, JR 2,572,891

TIMING CIRCUIT

Filed May 3, 1945 5 Sheets-Sheet 4

Inventor

CARL H. SMITH, JR.

By Ralph L. Chappell

Attorney

Oct. 30, 1951

C. H. SMITH, JR 2,572,891

TIMING CIRCUIT

Filed May 3, 1945

5 Sheets-Sheet 5

Inventor
CARL H. SMITH, JR.

By Ralph L. Chappell

Attorney

Patented Oct. 30, 1951

2,572,891

UNITED STATES PATENT OFFICE 2,572,891

TIMING CIRCUIT

Carl H. Smith, Jr., Arlington, Va.

Application May 3, 1945, Serial No. 591,771

2 Claims. (Cl. 250—27)

(Granted under the act of March 3, 1883, as amended April 30, 1928; 370 O. G. 757)

This invention relates in general to electronic timing circuits and in particular to a means for providing selective control over a plurality of functions.

An object of this invention is to provide a time pattern into which a group of pulses having certain time occurrences may be fitted for purposes of controllably operating a plurality of functions.

Another object of this invention is to provide an electronic pulse delay means wherein the time duration and time delay of the output pulse are both controllable and independent of the input pulse.

Another object of this invention is to provide an electronic pulse delay means wherein a plurality of time-delayed pulses can be obtained from a single input pulse.

Another object of the invention is to provide a means for altering the structure, time spacing, and duration of a group of pulses.

Another object of this invention is to provide a multiple timing system for generating a repetitive series of timing pulses in separate channels, all pulses bearing a certain time relationship to one another.

Figure 1:
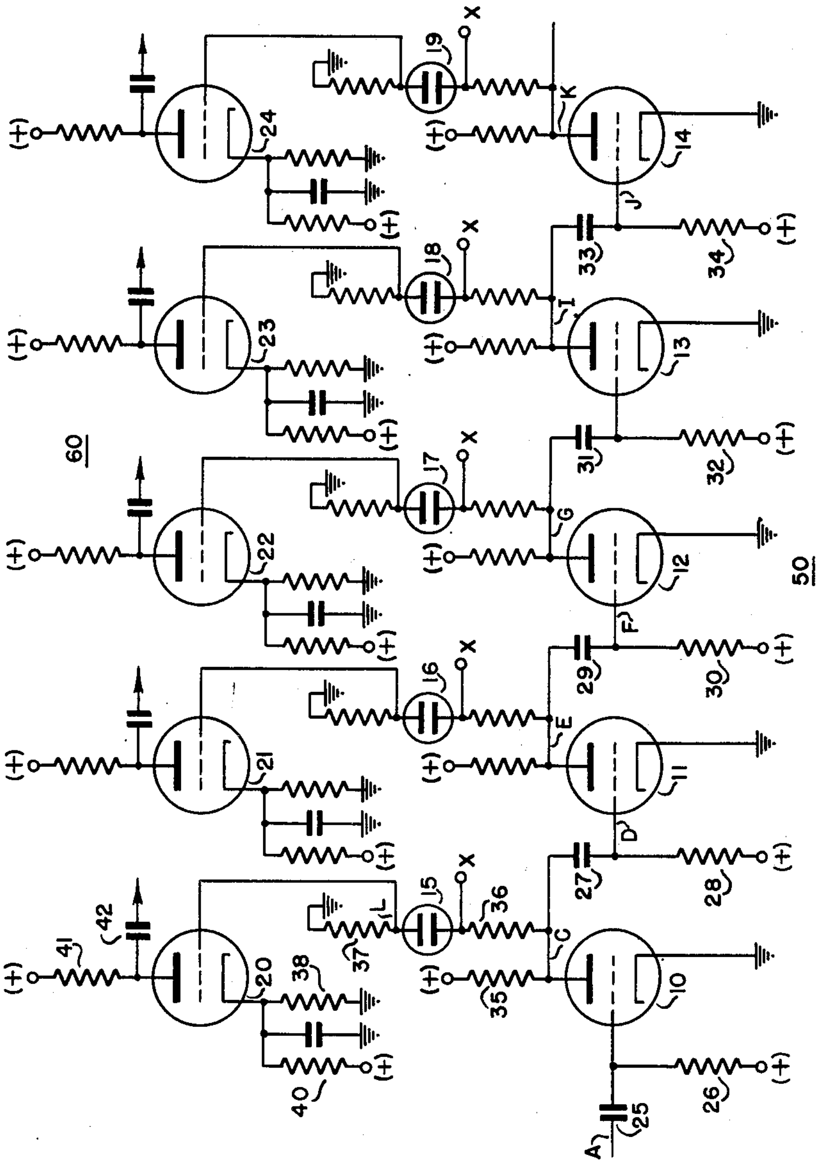
Fig. 1 is a circuit diagram of one embodiment of the invention.

With reference to Fig. 1, a circuit is shown which is representative of one embodiment of the invention and which is adapted to operate on a group of pulse signals in such a manner that each pulse signal in the group may be utilized to actuate a definite and distinct function. To accomplish the foregoing, a timing circuit indicated in general at 50 is provided, comprising a series of tubes 10 through 14 which are arranged so that a pulse signal applied to the circuit input at A will progress, at a predetermined rate, down the timing circuit. A second series of tubes indicated in general at 60 and comprising tubes 20 through 24 are connected to corresponding tubes in the timing circuit 50 in such a manner that as the pulse signal progresses down the timing circuit the tubes in the second series are consecutively rendered operative. In this manner any signal of a given group which is applied in parallel to the tubes in the second series 60 will pass through that tube in the second series according to its time relation to the signal applied to the input of the timing circuit 50.

In particular the circuit of Fig. 1 lends itself to use in the receiving equipment of the pulse system disclosed in the application of E. H. Krause, et al., entitled "Pulse Signalling System" S. N. 593,174 filed May 11, 1945. In the system of the above application a group of pulse signals is transmitted over a given time interval. The initial pulse of the group designates the start of the interval of transmission while the time occurrences of the remaining pulses in the group relative to the initial pulse convey the intelligence of the message. In adapting the instant embodiment to the above application the initial pulse in the received group is applied to point A in the timing circuit, while the remaining pulses in the group are applied in parallel to the input terminals X in the second series 60. Then as will be hereinafter described in detail, the initial pulse in the group progresses down the timing circuit to render operative, in succession, each of the tubes 20 through 24 whereby the remaining pulses in the group will be separated and passed through the tubes in the second series 60 according to their time relation to the initial pulse.

In the timing circuit 50, the tubes 10 through 14 are represented as triodes having separate plate-load resistances, typified at tube 10 by resistance 35, connected to a common source of positive potential and their cathodes returned to ground. Further, each stage is connected to the next succeeding stage through a resistance-capacitance coupling network, typified by capacitance 27 and resistance 28, connecting stages 10 and 11 together. The grid of each of the timing tubes is returned through a separate resistance to, for example, the same source of positive potential as its plate connection so that the grid of each tube is biased at a voltage slightly positive with respect to the cathode, determined by the voltage-dividing action of the grid-return resistance and the internal grid resistance of the tube.

If desired, the grids may be returned to the cathode potential; but by returning them to a positive potential, better stability in the operation of the circuit can be attained as will be seen hereinafter.

With either of the above grid-circuit connections each tube is normally held strongly conducting and a positive pulse applied to the grid of any of the tubes will cause further grid current to flow in that tube. This grid-current flow builds up a negative charge on the associated grid-coupling capacitance so that at the end of the applied pulse the charge accumulated on the capacitance will render the tube non-conducting. The time interval for which the tube is held non-conducting is primarily governed by the size of the grid-coupling capacitance and grid-return resistance through which the capacitance must discharge before the tube can be returned to conduction. Neglecting, for the moment, the coincidence means comprising tubes 15 through 24 and the associated circuit elements, the exact operation of the timing circuit 50 can be explained in the following manner:

A single positive pulse applied to the input of the circuit at point A causes grid current to flow in tube 10 with a consequent charging of the capacitance 25. At the end of the applied pulse the charge which has accumulated on capacitance 25 renders tube 10 non-conducting thereby causing a rise in the latter's plate voltage. Capacitance 25 eventually discharges through the grid-return resistance 26, restoring tube 10 to conduction and thereby causing the latter's plate voltage to return to normal. This action produces a positive voltage pulse on the plate of tube 10 which is of a time duration equal to the non-conducting period of that tube. This pulse, applied through the coupling capacitance 27 to the grid of the tube 11, causes increased conduction by the grid of 11 with consequent charging of capacitance 27. At the end of the applied pulse to this tube (when tube 10 resumes conduction) tube 11 is rendered non-conducting by the charge accumulated on capacitance 27 and is held non-conducting until capacitance 27 discharges through the grid-return resistance 28. This action produces a positive pulse on the plate of tube 11 which is applied through capacitance 29 to the grid of tube 12. A similar action continues on down the timing circuit, each tube passing into non-conduction in its proper order and for a time duration governed by the time constant in its grid circuit.

Figure 2:
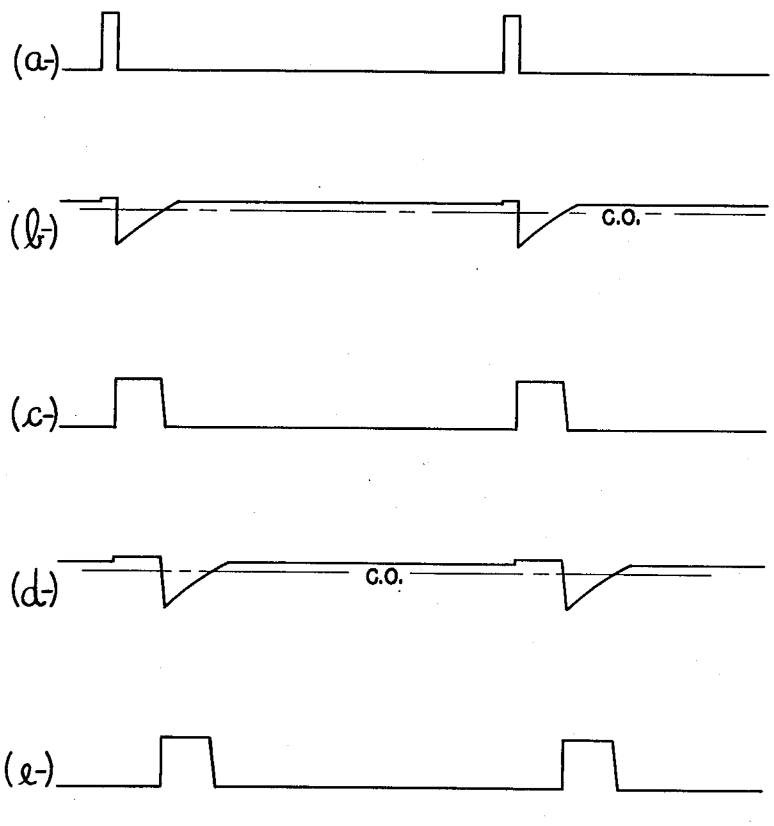
Fig. 2 shows a series of waveforms taken to illustrate the operation of the circuit shown in Fig. 1.

The waveform shown in Fig. 2 illustrate in detail the action that takes place in the first two stages, 10 and 11, of the timing circuit. Waveform *a* is representative of an input pulse applied to the point A. Waveform *b* illustrates the variation in grid voltage of tube 10 resulting from the application of waveform *a* to point A. Waveform *c* is the resulting positive voltage pulse appearing at the plate of tube 10. Waveforms *d* and *e* are representative respectively of the grid and plate voltage variations of tube 11 resulting from the application of the waveform *c* to the grid of 11.

From waveforms *b* and *d* the advantage obtained by returning the grids of the timing tubes to a positive potential rather than to ground is apparent. As illustrated by these two waveforms, the exponential trailing edges which are produced during the discharge of the coupling capacitances proceed toward a positive potential rather than zero or ground potential, so that the angle they make with the cut-off bias C. O. of the tube is very acute, thereby adding stability to the time duration of the pulses obtainable from the plates of the tubes.

From the waveforms of Fig. 2 it also becomes apparent that the time duration of the pulse appearing on the plate of any particular tube in the circuit is a function of the time constant in its grid circuit and that the total amount of time it is delayed from the applied input pulse at point A is a function of the time duration of the input pulse and of the time duration of the positive pulses appearing on the plates of the preceding tubes. It follows that the total time delay between an input pulse at point A and an output pulse at the plate of tube 14 is a function of the summation of all the grid time-constant circuits. Pulses of intermediate time delay are, of course, obtainable from the plates of the intermediate tubes. The total or intermediate time delays may be made controllable by making the grid-return resistances 26, 28, 30, 32 and 34 variable.

One method of operating the tubes in the second series 60 from the timing circuit 50 and one which is especially convenient where triodes are used in the series 60 is shown in Fig. 1. Each of the tubes in the timing circuit have connected in shunt with them a pair of current limiting resistances typified in the first stage 10 by resistances 36 and 37 and a gas tube, typified in the first stage by tube 15. When the tubes in the timing circuit are conducting, the voltage at their plates is made very nearly ground potential (about positive 5 or 10 volts) by making the plate-load resistances, typified by resistance 35, large compared to the plate resistance of the tube. This voltage when taken alone or when superimposed on a positive pulse signal applied to the terminal X, is of insufficient magnitude to ignite the neon tube. On the other hand, when one of the tubes, 10 for instance, becomes non-conducting following the application of a positive pulse to the input A, its plate potential rises to the positive supply potential to thus produce a voltage across the neon tube 15 which is sufficient to ignite it. As the neon tube 15 conducts, the current flowing through it and resistance 37 causes the potential at point L to rise by the voltage drop across the latter. As tube 10 resumes conduction, its plate potential falls nearly to ground potential to extinguish the neon tube 15 and thereby cause point L to return to ground. There is thus produced at point L a voltage pulse which is of a time duration equal to that of the positive pulse appearing at the plate of tube 10 and of a magnitude equal to the voltage drop across resistance 37. Then if a positive pulse signal is applied to the input terminal X during the time the neon tube 15 is conducting, it will also appear across the resistance 37. The point L and all corresponding points associated with the respective neon tubes 15 through 19 are directly connected to the grid of a corresponding tube in the second series 60. Each of the latter tubes, 20 through 24, is preferably of the sharp cut-off variety and is normally biased below cut-off by means of the voltage-dividing action present in the cathode circuit, typified by resistances 38 and 40 in the first stage 20. This bias voltage is adjusted so that when any one of the neon tubes conducts the voltage drop across the resistance on the ground side of the neon tube will raise the bias of the corresponding tube in the second series 60 just to cut-off, thus placing this tube in a condition to amplify a signal applied to it by way of the input terminal X.

In the circuit of Fig. 1, the timing circuit 50 alone may be used to produce pulse delay or to alter the duration and spacing of a particular group of pulses. As will be shown later, the number of stages required to perform these functions depends upon the number of pulses to be altered and the degree of alteration required.

Figure 3:
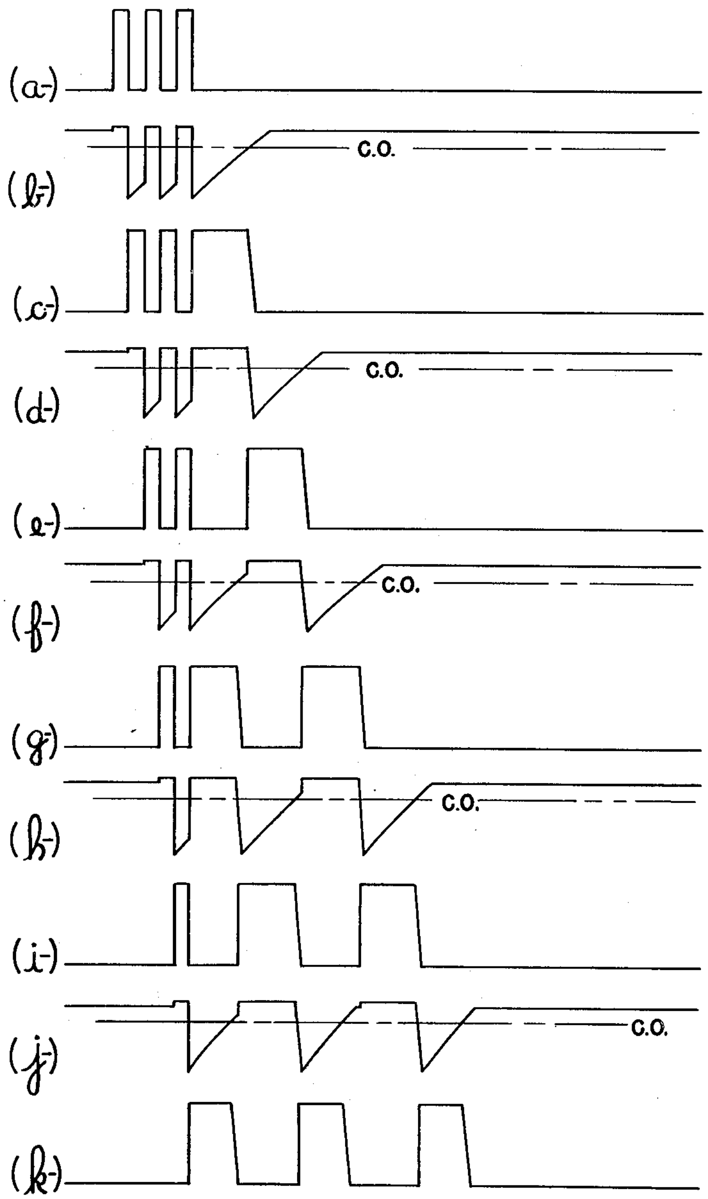
Fig. 3 shows a series of waveforms taken to illustrate the operation of the circuit shown in Fig. 1 when the latter is used for the purpose of altering the structure of a group of pulses.

The operation of the timing circuit in delaying and altering a particular group of three pulses is as follows:

The group of three pulses shown by the waveform *a* in Fig. 3 is applied to the input (A of Fig. 1) of the timing circuit. The first of these three pulses produces heavy conduction by the grid of tube 10 to thus charge capacitance 25. At the conclusion of this pulse the charge stored on capacitance 25 drives the grid of 10 below cut-off potential. The second positive pulse is applied to tube 10 before the capacitance 25 has been discharged completely, but it brings tube 10 to conduction for the duration of the pulse. At the conclusion of the second pulse tube 10 returns to a cut-off condtion. The third pulse is applied to the grid of tube 10 again returning the tube to conduction. At the conclusion of the third pulse tube 10 remains cut off until capacitance 25 discharges sufficiently to permit it to conduct. Waveform *b* illustrates the variations in grid voltage at tube 10 while waveform *c* shows the resulting voltage at the plate of this tube.

The three positive pulses at the plate of tube 10 are applied to the grid of tube 11 through capacitance 27. The first of these pulses charges capacitance 27. At the conclusion of this pulse tube 11 is cut off but returns to conduction during the second pulse, is cut off at the end of the second pulse, conducts again during the long third pulse and is cut off at the conclusion of the third pulse until capacitance 27 discharges sufficiently to permit it to resume conduction. Waveforms *d* and *e* represent respectively the resulting voltage variations at the grid and plate of tube 11.

In a similar manner the three pulses at the plate of tube 11 function to produce the voltage variations at the grid and plate of tube 12 as shown by waveforms *f* and *g*.

The three pulses at the plate of tube 12 function to produce the voltage variations at the grid and plate of tube 13 as shown by waveforms *h* and *i*.

Finally the output from the plate of tube 13 is applied to stage 14, from the plate of which is obtained the final waveform *k*. The duration of these pulses is determined by the off period of tube 14. In this illustration the delay in time between the application of the initial trigger pulse and the start of the first output pulse is approximately equal to the total period of time over which the initial three pulses occurred. Added delay or changes in the pulse formation, such as time delay of pulse output, can be obtained by additional stages with the necessary time constants in the grid circuits.

The timing circuit shown in Fig. 1 may be subject to some variation in the rate that an input pulse applied at point A will progress down the chain; consequently, some tolerance must be provided between the width of the pulses produced at the plates of the tubes in the timing circuit and those applied to the terminals X. The principal causes which might result in a variation in progression rate are variations in plate-supply voltage and variations in circuit elements.

Figure 4:
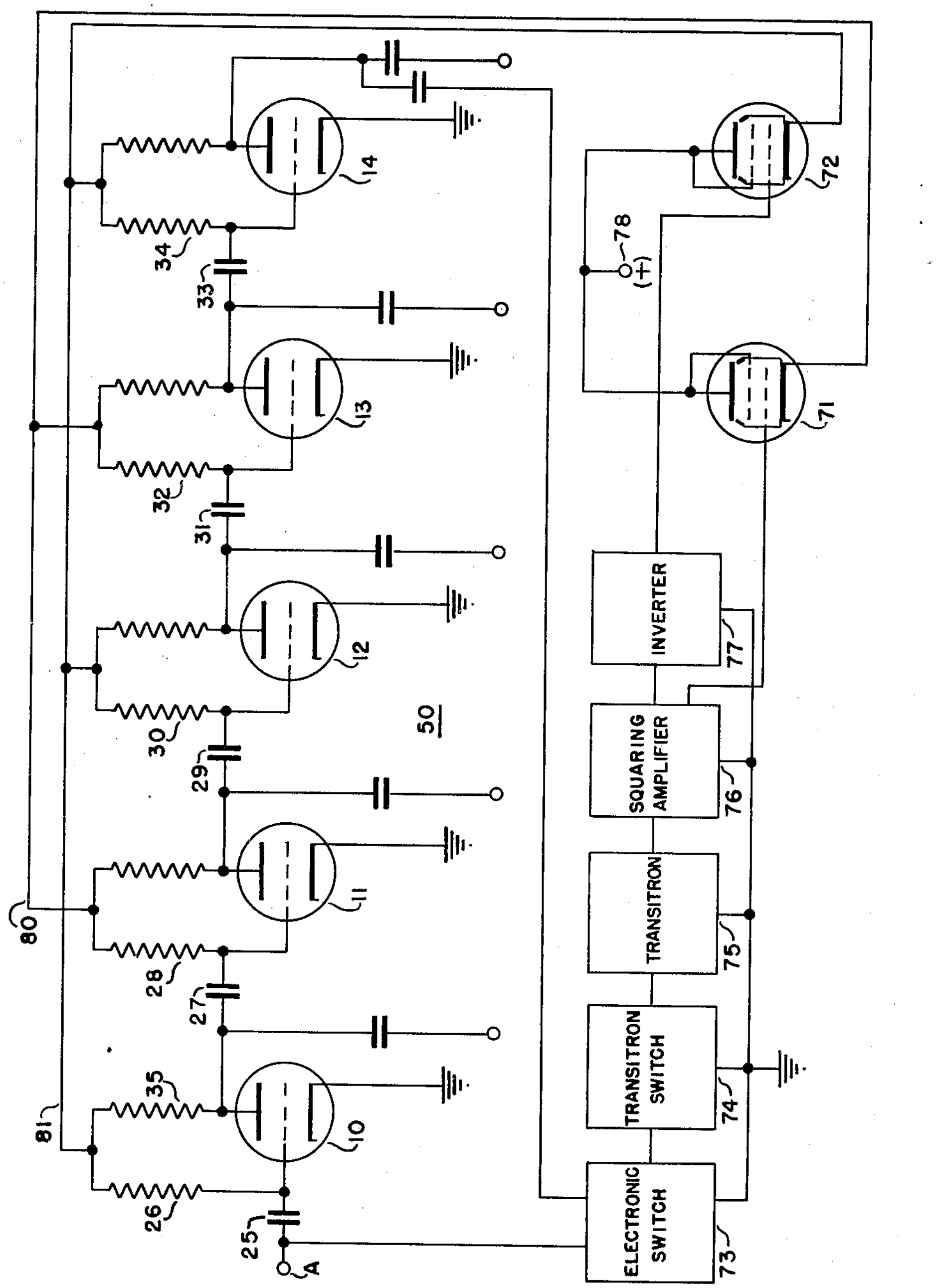
Fig. 4 is a circuit diagram of a second embodiment of the invention, including, in block, special synchronizing means.

A timing circuit which is not subject to variations in the pulse-progression rate which, for certain applications might be objectionable, is shown in Fig. 4. In this embodiment a "switched" power-supply voltage is employed. Two supply lines 80 and 81 are used, alternate tubes 10, 12, 14 being supplied from line 81 and tubes 11, 13 from the line 80. A rectangular supply voltage alternating, for example, between plus 200 volts and plus 50 volts is applied to each of the plate-supply lines 80 and 81 such that line 80 is at 200 volts while line 81 is at 50 volts and vice versa. Switching of this supply voltage may be timed accurately by means of a resonant inductance-capacitance circuit.

If the natural non-conducting period of each of the stages in the timing circuit 50 is made slightly longer than the period that the high supply voltage is applied to the stage, the progression of the pulse through the various stages will be in exact synchronism with the switched plate voltage. For each complete cycle of the plate voltage the pulse will progress through two stages of the timing chain.

Initially all of the tubes in the timing circuit supplied by one of the supply lines are conducting heavily while those supplied by the other line are conducting lightly. This condition is reversed during the following half cycle of plate-supply voltage. To prevent generation of spurious signals within the timer itself due to the switching of the plate-supply voltage, the tube grids are returned to the switched supply lines through the grid-coupling resistances. The function of this connection is to raise the grid potential when the supply rises, thus increasing the conductivity of the individual tubes when the supply rises and lowering the grid potential to decrease conductivity when the supply voltage decreases, so that the actual potential at the plates of the tubes is undisturbed. By proper selection of the grid and plate resistances this compensating action is entirely adequate to prevent generation of spurious signals.

To illustrate the action of the timing circuit when a pulse is applied to the grid of tube 10, consider the condition when initially high supply voltage is applied to the tubes 11, 13 and low supply voltage is applied to tubes 10, 12, 14. A positive pulse applied to the grid of 10 will cause heavier conduction by that grid resulting in a charge being developed across capacitance 25. At the conclusion of the positive pulse, the grid will be driven negative due to the accumulated charge on 25. If, now, high supply voltage is applied to tubes 10, 12, 14 and low voltage to tubes 11, 13, the plate of tube 10 will rise to the high voltage since the charge on capacitance 25 holds its grid below cut-off potential. The voltage at the plates of 12 and 14, however, will not rise because the increased grid potential causes heavier conduction by those tubes and because the capacitances 29, 33 are not charged. The high positive potential at the plate of tube 10 causes increased conduction by the grid of 11 with consequent charging of capacitance 27. When the switched supply again reverses, the drop in voltage at the plate of 10 is coupled to the grid of 11 through capacitance 27 and drives this grid far negative. At the same time high voltage is applied to 11; and since this tube cannot conduct as a result of the high negative bias on the grid, its plate rises toward the supply voltage. The grid of tube 12 then conducts heavily charging the capacitance 29. In a similar manner the pulse progresses on down the timing circuit in exact synchronism with the switched power supply, provided the natural cut-off period of each stage with full supply voltage applied continuously is somewhat longer than the period of application of the switched supply voltage to any particular stage and less than the total period of the supply switching cycle.

One suitable arrangement which may be employed to produce an alternating plate supply for the tubes in the timing circuit is shown at the bottom of Fig. 4 and includes a pair of high current tubes 71 and 72 which are connected in series with a positive voltage source 78 and the respective supply lines 80 and 81 and are grid excited in push-pull relationship by a square-wave generator. A detailed description of the square-wave generator may be found in the aforementioned patent application where it is used for the purpose of generating a time base. The several components which comprise the generator include an Eccles-Jordan electronic switch 73, a transitron oscillator 75, a switch 74 for keying the oscillator, a squaring amplifier 76 and an inverter 77. As indicated in the figure, a signal applied to the input A of the timing circuit is also applied to the electronic switch 73 to thereby key the latter. Whereupon switch 73 operates to trip switch 74 to start the transitron 75. The sine wave output from the transitron is then transformed into a square-wave voltage by the action of the squaring amplifier 76 which may be any suitable type known to the art. The square-wave output from the latter is then applied to the grid of tube 71 and also through the inverter-amplifier 77 to the grid of tube 72 to thus provide the push-pull drive to the tubes 71 and 72. After the transitron has produced a given number of cycles, the pulse applied to the timing circuit input A appears at the plate of the final tube 14 and is returned to the electronic switch 73. Whereupon the electronic switch is again actuated to trip switch 74 and stop the transitron pending the arrival of another signal at the input A.

Figure 5:
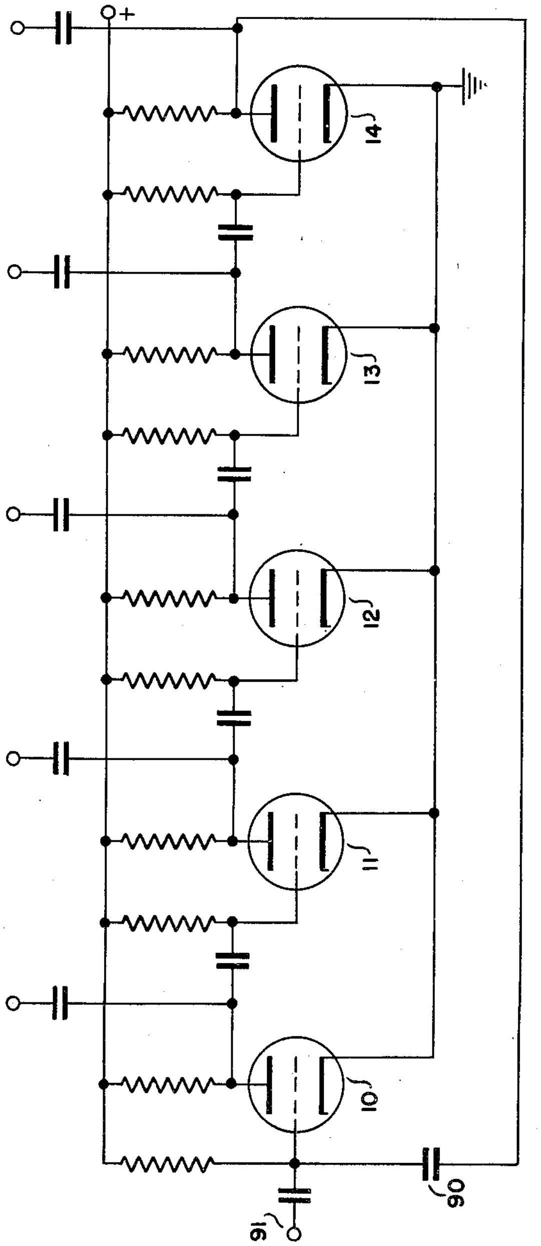
Fig. 5 is a circuit diagram illustrating additional features of the circuit of Fig. 1.

In Fig. 5 the basic timing circuit of Fig. 1 is shown with the plate of tube 14 connected to the grid of tube 10 by a blocking capacitance 90. Thus, a positive pulse applied to terminal 91 will progress down the chain in the manner previously described producing a positive pulse at the plate of each tube in turn. The positive pulse thus produced at the plate of 14 is then applied by means of capacitance 90 to the grid of 10. In this manner the pulse progresses through the chain continuously, producing at the plates of all tubes positive pulses of a definite duration, each bearing a fixed time relationship to the pulses at the other plates.

Although this invention has been shown and described as containing certain definite elements and combination thereof, it must be borne in mind that modification of these basic ideas may be made without exceeding the spirit of the invention. For example, other coincidence means, such as tubes having multiple control grids, may be employed in the circuit of Fig. 1, and the multiple timing circuit of Fig. 5 may employ an accurately timed switched voltage supply similar to that employed in Fig. 4 for greater accuracy of operation. Therefore this invention is not to be limited except insofar as is necessitated by the spirit of the prior art and the scope of the appended claims.

The invention shown and described herein may be manufactured and used by or for the Government of the United States of America for governmental purposes without the payment of any royalties thereon or therefor.

What is claimed is:

1. A timing circuit comprising a series of tubes, each of said tubes having at least a plate, a cathode, and a control grid, separate capacitance means coupling the output of each of said tubes to the input of the next succeeding tube in said series, means producing a pair of alternating supply voltages, which are arranged so as to alternate in phase opposition, and separate resistance means connecting both the grid and plate of alternate tubes in said series to one of said plate-supply voltages and the grid and plate of the remaining tubes in said series to the other of said plate-supply voltages.

2. A timing circuit comprising a series of vacuum tubes, each of said tubes having at least a plate, a cathode, and a control grid, separate capacitance means coupling the plate of each of said tubes to the grid of the next succeeding tube in said series, means producing a pair of alternating supply voltages which are arranged so as to alternate in phase opposition, separate grid and plate resistance means connecting the grids and plates of alternate tubes in said series to one of said supply voltages and the grids and plates of the remaining tubes in said series to the other of said supply voltages, said grid resistance means and the capacitance means cooperating to form individual time constant circuits operative following the application of a positive voltage pulse to the grid of the respective tube to develop a gradually diminishing blocking bias voltage for the associated tube, an input signal circuit for supplying a selected number of input signals of first characteristics to one tube of the series, and output circuits connected to the tubes of the series to provide output signals equal in number to the number of input signals and having different time characteristics.

CARL H. SMITH, Jr.

REFERENCES CITED

The following references are of record in the file of this patent:

UNITED STATES PATENTS

| Number | Name | Date |
|---|---|---|
| 2,011,381 | Suits | Aug. 13, 1935 |
| 2,021,743 | Nicolson | Nov. 19, 1935 |
| 2,076,335 | Dallenbach | Apr. 6, 1937 |
| 2,210,574 | Fitch | Aug. 6, 1940 |
| 2,308,778 | Prince, Jr. | Jan. 19, 1943 |
| 2,313,906 | Wendt | Mar. 16, 1943 |
| 2,471,408 | Busignies | May 31, 1949 |

FOREIGN PATENTS

| Number | Country | Date |
|---|---|---|
| 543,117 | Great Britain | Feb. 11, 1942 |